United States Patent
Gomez

(10) Patent No.: US 6,178,327 B1
(45) Date of Patent: Jan. 23, 2001

(54) METHOD AND APPARATUS FOR PROVIDING FAULT TOLERANCE IN FREQUENCY REUSE WIRELESS COMMUNICATION SYSTEMS

(75) Inventor: Susan Lorraine Gomez, Lake in the Hills, IL (US)

(73) Assignee: Motorola, Inc., Schaumburg, IL (US)

(*) Notice: Under 35 U.S.C. 154(b), the term of this patent shall be extended for 0 days.

(21) Appl. No.: 09/074,750

(22) Filed: May 8, 1998

(51) Int. Cl.$^7$ .................................................. H04B 7/00
(52) U.S. Cl. ..................... 455/445; 455/447; 455/436; 455/438; 455/439; 370/216; 370/242
(58) Field of Search ..................... 455/8, 9, 447, 455/67.1, 437, 561, 434, 515, 560, 423, 424, 425, 436–439, 445

(56) References Cited

U.S. PATENT DOCUMENTS

| | | | |
|---|---|---|---|
| 4,180,708 | * 12/1979 | Yamaguchi et al. | 455/423 |
| 4,485,486 | * 11/1984 | Webb et al. | 455/450 |
| 5,146,486 | * 9/1992 | Lebowitz | 379/40 |
| 5,297,193 | * 3/1994 | Bouix et al. | 455/423 |
| 5,541,978 | * 7/1996 | Brunner et al. | 455/423 |
| 5,548,631 | 8/1996 | Krebs et al. | 455/426 |
| 5,757,810 | * 5/1998 | Fall | 714/704 |
| 5,987,332 | * 11/1999 | Gettleman et al. | 455/518 |
| 5,991,622 | * 11/1999 | Henry, Jr. | 455/434 |
| 5,991,639 | * 11/1999 | Rauitiola et al. | 455/553 |

* cited by examiner

*Primary Examiner*—Nay Maung
*Assistant Examiner*—Temica M. Davis
(74) *Attorney, Agent, or Firm*—Scott M. Garrett

(57) ABSTRACT

A base station (106) is connected to several communication servers (114, 116, 118) by a corresponding number of communication links (128). Should one or more of the connections fail, the base station comprises a base mobile radio (210) for scanning one or more neighbor cells (108–113) to determine their current service status. The neighbor cells have overlapping coverage with serving cell, but on different frequencies. The base station broadcasts a fault message along with the updated neighbor cell information to mobile stations (102), allowing the mobile stations to choose the most appropriate cell for the desired communication activity.

8 Claims, 4 Drawing Sheets

METHOD AND APPARATUS FOR PROVIDING FAULT TOLERANCE IN FREQUENCY REUSE WIRELESS COMMUNICATION SYSTEMS

TECHNICAL FIELD

This invention relates in general to wireless communication systems, and more particularly to fault tolerant frequency reuse wireless communication systems.

BACKGROUND

Wireless communication systems are in widespread use for a variety of applications. Perhaps the best known wireless system architecture is the frequency reuse design, commonly referred to as cellular. Cellular systems have traditionally been used to provide telephone interconnect service, providing a mobile station with a wireless interface to the public switched telephone network, but more recently additional types of communications services are being provided in cellular systems, and with newer interface protocols and modulation schemes.

In frequency reuse or cellular systems, a serving cell is established in the local vicinity of a base station. An array of base stations provide service coverage over a region which may be a small metropolitan area or a state wide network. Adjacent cells are referred to as neighbor cells, and as a mobile station travels from one serving cell to the next, the service is handed off from the serving cell's base station to the neighbor cell's base station, and the neighbor cell becomes the serving cell for the mobile station. This scheme allows the reuse of radio frequencies in a metropolitan region since the power of the base station's transmitter is usually very low compared to other types of broadcast service.

In a typical cellular network, the base stations of a given region are operably coupled via a communications link to a communications server in a central office. Traditional cellular telephone systems have a mobile switching center as a communications server to provide telephone interconnect service. More recently other types of communication service have been offered, such as, for example, dispatch service, which is sometimes referred to as direct connect. For each type of service a different communications server is typically used, or a more conventional communications server is fitted with additional hardware and software to provide additional functionality.

The communications link between the base station and the communications server(s) is typically terrestrial plant, such as a hybrid fiber/coaxial cable network, for example. Signals may be carried to and from the base station by any one of several common and well known protocols, such as frame relay or SS7, for example. If more than one service is provided by a base station, then there is typically a dedicated communications link between the base station and each communications server.

Communications links carried over terrestrial plant are susceptible to faults, resulting in a disruption of service. Faults occur when, for example, in-line regenerative amplifiers fail or when cables are knocked out of service. One way to avoid service outages is to set up redundant communications links between the base station and the communications servers, each of the links using a different physical path between the base station and the communications servers. When a fault is detected on the active communications link the system switches to the redundant link.

However, installing and maintaining a multi-path redundant network plant is a considerable and on going expense for a network operator. In many networks, it is often the highest operating expense. Furthermore, the circumstances that create the failure of a first communications link may very well affect other links, including redundant links. For example, in northern climates winter storms can cause substantial damage to terrestrial based communications links. Even with multi-path redundancy, when multiple failures occur, mobile stations are not informed with current neighbor cell information, and cannot determine if a neighbor cell can provide the desired service. Therefore, there is a need for a means by which fault tolerance may be provided in a wireless frequency reuse communications system wherein mobile stations receive current neighbor cell information updates.

DETAILED DESCRIPTION OF THE PREFERRED EMBODIMENT

Figure 1:
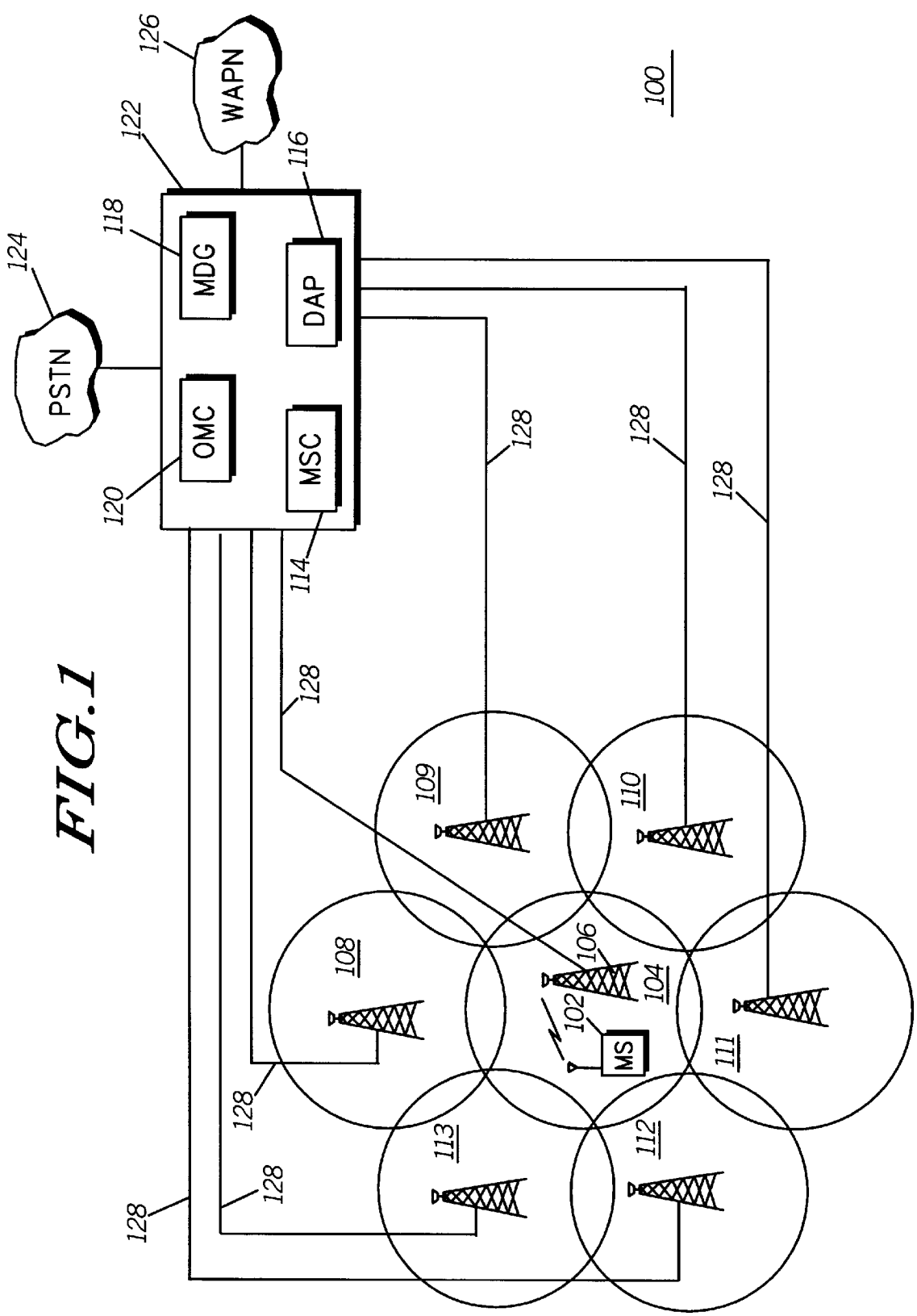
FIG. 1 shows a diagram of a wireless frequency reuse system in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of providing fault tolerance in a wireless frequency reuse communication system without the use of redundant communications links between each base station and the communications server by taking advantage of the overlapping coverage of adjacent or neighbor cells, combined with an ability to determine the current status of neighbor cells, without using a connection to a central office to do so. It is known that a serving cell can get stored information regarding its neighbor cells, but if a fault occurs between the serving cell and the central office, the serving cell cannot get current information, and since, if the serving cell is affected, the neighbor cells may likewise be affected, previously stored neighbor cell information may not be correct. The invention solves this problem by, upon detecting a fault in a communication link, updating and broadcasting a neighbor cell list including current neighbor cell service information to any mobile stations communicating with the base station. The neighbor cell list informs the mobile station which neighbor cells can provide the desired service. The mobile station then determines which of the neighbor cells is the optimum choice based on, for example, received signal strength. This novel method is performed with the use of a radio receiver co-located with the base station, and operably coupled to the base station so that the base station does not need connectivity with a central office to determine the status of its neighbor cells.

Referring now to FIG. 1, there is shown a diagram 100 of a wireless frequency reuse system in accordance with the invention. A mobile station 102 is located in a serving cell 104 that is established by a base station 106. The serving cell has at least one neighbor cell, such as any one of neighbor cells 108, 109, 110, 111, 112, or 113, or any combination thereof. The neighbor cells are located adjacent to the serving cell and have an overlapping coverage area, as is known in the art. Each cell has an associated base station. Furthermore, each base station is operably coupled to at least one communications switch or server, such as any one of a mobile switching center (MSC) 114, a dispatch applications processor (DAP) 116, or a mobile data gateway (MDG) 118, as examples. An operations maintenance center (OMC) 120 is also coupled to each base station. The communications server is typically located in a central office 122, and if more than one communications server is available, they may be located together in the central office, although it is not required. The communications servers, in general, provide functionality to establish a communications session between a mobile station and one or more parties. For example, as is well known in the art, a MSC provides switching and call processing capability to necessary to establish telephone interconnect service. The MSC may connect the a mobile station to another mobile station, or to a public switched telephone network (PSTN) 124. Likewise, a MDG provides packet data connectivity to a wide area packet network (WAPN) 126, such as the internet. A DAP provides high speed, intra-system, half-duplex, one to one, or one to many voice connectivity. A voice packet duplicator is used in conjunction with a DAP, as is well known in the art. Thus, a communications server provides a means to establish a particular type of communications service.

Each base station is connected to a communications servers individually by a communications link, represented by the lines numbered 128. Each line 128 represents at least one communications link, and if the base station is operably coupled to a number of communications servers, the line represents an equivalent number of communications links. A communications link is established physically by a terrestrial-based plant, such as a hybrid fiber/coaxial cable plant, for example, and may include microwave radio relay links. Various protocols may be used over the physical medium, such as frame relay, an example of which is the so-called T1 transport protocol.

Figure 2:
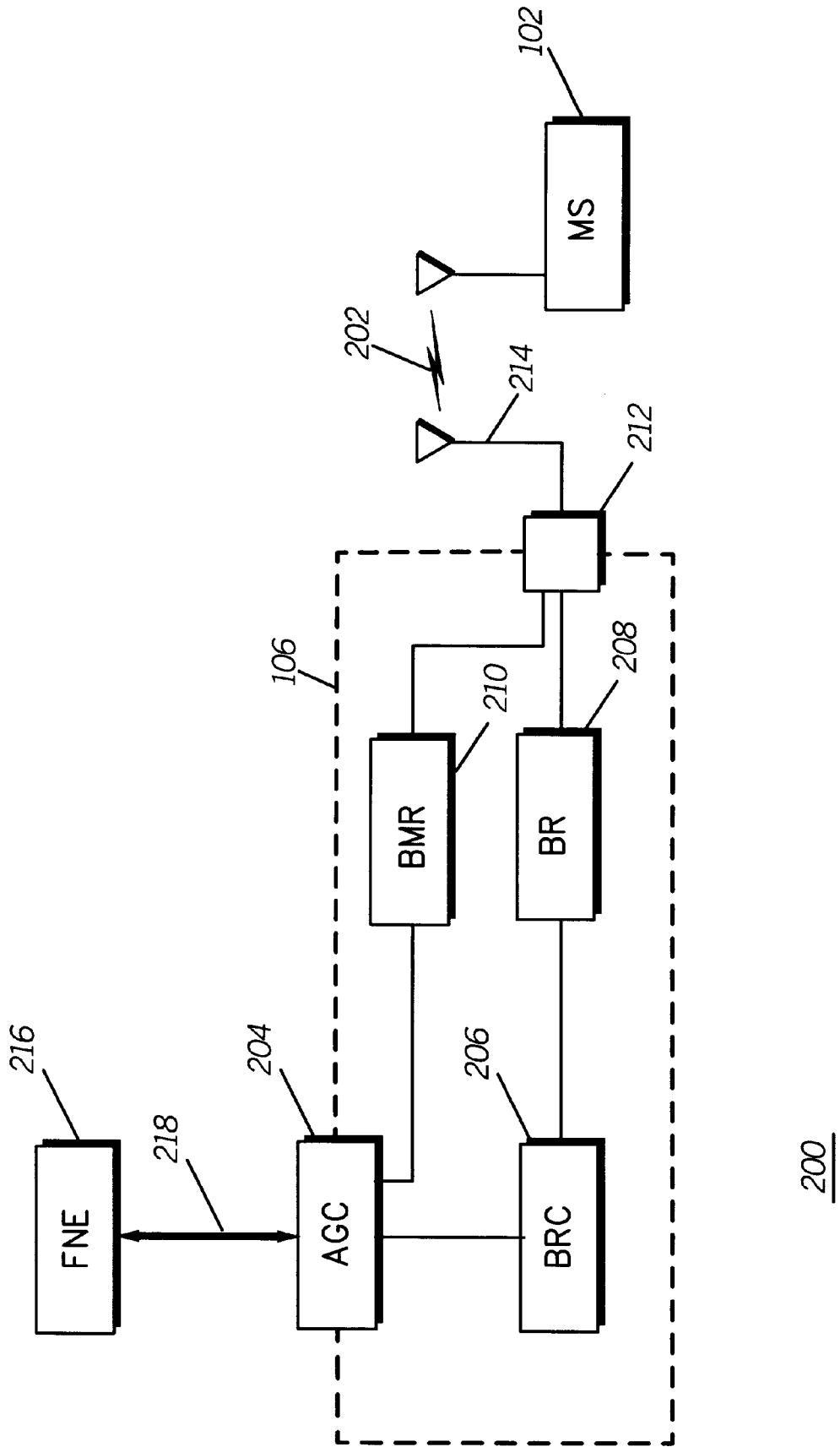
FIG. 2 shows a block diagram of a base station in accordance with the invention.

Referring now to FIG. 2, there is shown therein a block diagram 200 of a base station 106 in accordance with the invention. The base station communicates with at least one mobile station 102, as described above in reference to FIG. 1, over a radio link 202. The base station 106 comprises an access controller gateway (ACG) 204, and transceiver equipment such as a base radio controller (BRC) 206, a base radio (BR) 208, a base mobile radio (BMR) 210, a power amplifier 212 and an antenna 214. The ACG interfaces with the fixed network equipment (FNE) 216, such as a central office shown in FIG. 1, over a plurality of communication links 218. Specifically the ACG receives data from, and transmits data to the communications servers. Each communication server is connected by one communication link. The base radio controller controls the modulation and synchronization of signals processed by the base radio. The base radio comprises radio signal processing equipment for mixing, filtering, and so on.

The base mobile radio is operably coupled to the ACG and the transceiver resources, and is much the same as what is referred to as a test mobile radio. That is, if comprises radio hardware and software similar to that of a mobile station, and is used for detecting or scanning for neighbor cells. If a fault occurs in one or more of the communications links 218, the ACG will immediately detect the loss of communications with the respective communications server. In response, the ACG will request a neighbor cell list from the base mobile radio. The base mobile radio may have determined the neighbor cell list and communication service information prior to the request from the ACG, or it may generate the neighbor cell list in response to the request. The neighbor cell list may comprise information such as the cell identification number, what frequency the cell is operating on, and which communication services are provided by the cell, for each neighbor cell detected. Upon the occurrence of a fault between the base station and one or more communications servers, the neighbor cell list is updated and broadcast from the serving cell's base station. Any mobile stations that were connected to the serving cell at the time of the fault, and any that come into the serving cell after the occurrence of the fault and prior to the repair of the fault will receive the broadcast message from the base station indicating the existence of the fault condition, which service or services are not functional, and the neighbor cell list including the current service states of those neighbor cells.

Any mobile station receiving the fault message and neighbor cell list with current service information can then make a determination if the serving cell can support the necessary communications service, or if it must select one of the neighbor cells. In the event that not all of a plurality of communications links are faulted, the serving cell may still provide one or more communications services, and the mobile station may still connect to the base station. However, if the particular service desired by the operator of the mobile station is unavailable because of a faulted communications link, the mobile station will then begin selecting a suitable neighbor cell, if one is available. The received signal strength of the neighbor cells will dictate which of the neighbor cells supporting the desired communication service will be selected. This is possible because the neighbor cell and serving cell coverage areas overlap, as is known in the art. Although the signal will not typically be as strong as if connected to the serving cell's base station, because of the overlap in coverage area the mobile station can, quite often, connect to one or more neighbor cell base stations, and thus engage in the desired communication activity.

Figure 3:
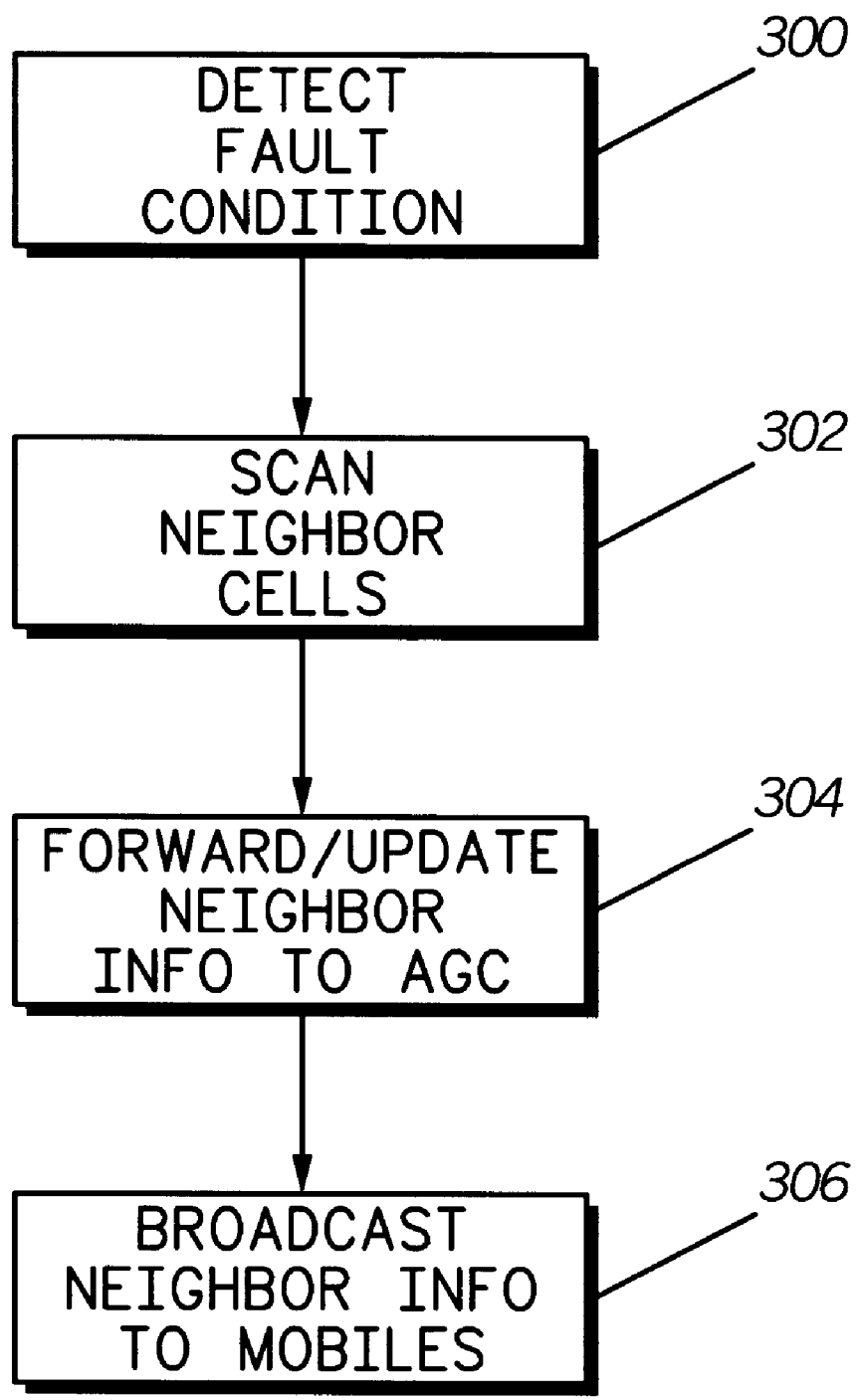
FIG. 3 shows a process flow chart of a method performed at a base station for providing fault tolerance in accordance with the invention.

By detecting faults in the communications links, and alerting mobile stations to the fault condition, along with a list of potential neighbor cells, a level of fault tolerance is achieved. Referring now to FIG. 3, which shows a process flow chart of a method performed at a base station for providing fault tolerance in accordance with the invention. In the preferred embodiment, the ACG of the base station begins by detecting 300 a fault or failure in at least one of the communication links between the base station and a communications server. This includes faults in a telephone interconnect, dispatch, packet data, and circuit data circuits, as examples. If a neighbor scan has not been performed recently, the ACG orders the base mobile radio to begin scanning 302 for neighbor cells. The base mobile radio responds by updating a neighbor cell list and forwarding 304 the neighbor cell list to the ACG. After receiving the neighbor cell list from the base mobile radio, the base station begins broadcasting 306 a fault detection message indicating the existence of the fault condition, and a service status message indicating which communications services are affected, along with the neighbor cell list including current neighbor cell status information. The base station will still accept new mobile stations and support whichever, if any, communications services remain available.

Figure 4:
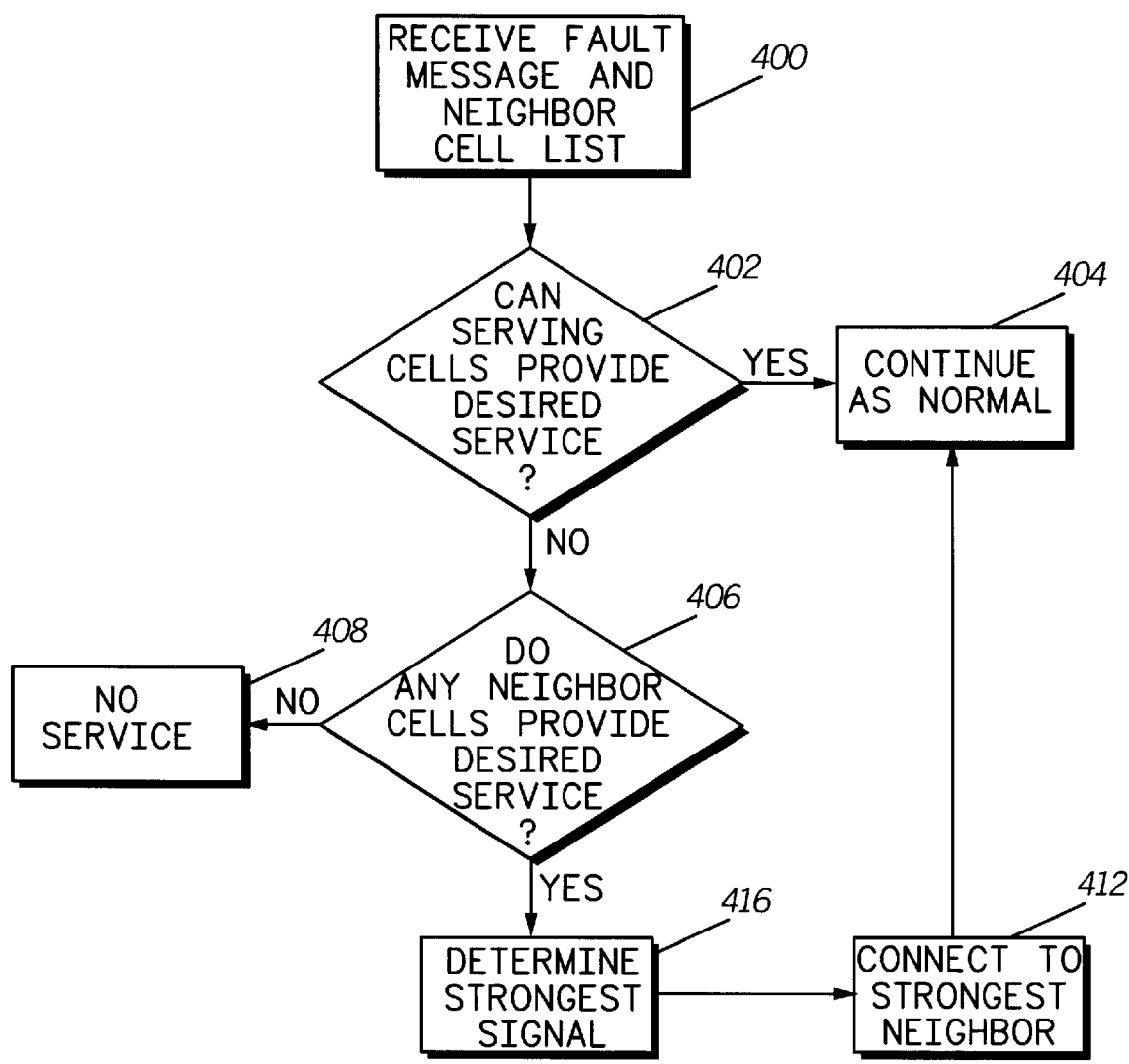
FIG. 4 shows a process flow chart of a method performed at a mobile station for providing fault tolerance in accordance with the invention.

A mobile station presently connected to the serving cell base station at the time of the fault, or one that tries to connect subsequent to the time of the fault must decide what to do. Referring now to FIG. 4, there is shown a process flow chart of a method performed at a mobile station for providing fault tolerance in accordance with the invention. The method allows a mobile station to avoid a compromised serving cell if that serving cell is unable to support the desired communication activity. The method begins by first receiving 400 a fault message and neighbor cell list. The mobile station then determines 402 if, based on the fault message, the desired communications mode or service is available from the serving cell. If the serving cell can provide the desired communications service, the mobile continues 404 as normal. If the desired service was one of the faulted services, the mobile station determines 406 if any of the neighbor cells can support the desired service, based on the information in the neighbor cell list. If none of the neighbor cells listed can support the desired service, then no service 408 is available. If at least one neighbor cell can provide the desired service, then the mobile station begins scanning the frequencies corresponding to the neighbor cells, as indicated in the neighbor cell list, to determine 410 the strongest neighbor cell signal, such as a by received signal strength indicator (RSSI), as is well known in the art. Subsequently, the mobile station connects 412 to the strongest neighbor cell, and continues as normal.

Thus, fault tolerance is provided in a frequency reuse wireless communication system by taking advantage of the overlap in adjacent cell coverage, and the ability of a mobile station to choose which cell to connect with. Typically the mobile station will choose the cell providing the strongest signal, but under fault condition it can select another nearby cell aided by the information broadcast by the compromised cell. The use of a neighbor cell list created by a base mobile radio in the faulted serving cell speeds the process of selecting an alternate cell since the mobile station will not have to perform the scan itself.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of providing fault tolerance in a frequency reuse wireless communication system, comprising the steps of:

detecting a fault between a base station and a communications server, the base station for providing a plurality of communication services;

scanning for at least one neighbor cell capable of providing the communication service in which the fault was detected, performed by a base mobile radio located at the base station;

updating a neighbor cell list at the base station while performing the step of scanning;

broadcasting a fault detection message indicating in which communications services a fault was detected;

broadcasting the neighbor cell list in a serving cell, performed by the base station after performing the step of updating;

receiving the neighbor cell list;

selecting a neighbor cell from the neighbor cell list; and connecting to the neighbor cell selected in the step of selecting;

wherein the steps of receiving, selecting, and connecting are performed sequentially by a mobile station in the serving cell.

2. A method of providing fault tolerance as defined in claim 1, wherein the step of detecting is performed by an access controller gateway located at the base station.

3. A method of providing fault tolerance as defined in claim 1, wherein the step of detecting comprises detecting the fault in a telephone interconnect circuit between the base station and the communications server.

4. A method of providing fault tolerance as defined in claim 1, wherein the step of detecting comprises detecting the fault in a dispatch circuit between the base station and the communications server.

5. A method of providing fault tolerance as defined in claim 1, wherein the step of detecting comprises detecting the fault in a packet data circuit between the base station and the communications server.

6. A method of providing fault tolerance as defined in claim 1, wherein the step of detecting comprises detecting the fault in a circuit data circuit between the base station and the communications server.

7. A method for a mobile station to avoid a compromised serving cell, the serving cell established around a base station, the base station for providing a plurality of communication services, the base station having updated a neighbor cell list to include current service information for each one of a plurality of neighbor cells by scanning the neighbor cells from the base station, the method comprising the steps of:

detecting a fault in one of the plurality of communications services;

broadcasting a fault detection message, indicating in which communications service the fault has been detected, and a neighbor cell list, performed by the base station;

receiving the neighbor cell list;

selecting a neighbor cell from the neighbor cell list; and connecting to the neighbor cell selected in the step of selecting;

wherein the steps of receiving, selecting, and connecting are performed sequentially by the mobile station in the serving cell.

8. A method for a mobile station to avoid a compromised serving cell as defined in claim 7, wherein the base station provides a plurality of communication services, the step of broadcasting comprises broadcasting the service status of the serving cell.

* * * * *